(12) United States Patent
Gretz

(10) Patent No.: US 7,407,138 B1
(45) Date of Patent: Aug. 5, 2008

(54) GANGABLE CABLE SUPPORT WITH IMPROVED STIFFNESS

(75) Inventor: Thomas J. Gretz, Clarks Summit, PA (US)

(73) Assignee: Arlington Industries, Inc., Scranton, PA (US)

( * ) Notice: Subject to any disclaimer, the term of this patent is extended or adjusted under 35 U.S.C. 154(b) by 596 days.

(21) Appl. No.: 11/041,476

(22) Filed: Jan. 24, 2005

(51) Int. Cl.
*E21F 17/02* (2006.01)

(52) U.S. Cl. .................... 248/58; 248/68.1; 248/304; 248/339

(58) Field of Classification Search ............... 248/58, 248/65, 68.1, 304, 305, 59, 62, 339
See application file for complete search history.

(56) References Cited

U.S. PATENT DOCUMENTS

| | | | |
|---|---|---|---|
| 5,542,631 A | | 8/1996 | Bruno |
| 5,740,994 A | * | 4/1998 | Laughlin .................... 248/68.1 |
| 5,961,081 A | * | 10/1999 | Rinderer .................... 248/68.1 |
| 6,565,048 B1 | | 5/2003 | Meyer |
| 6,629,676 B1 | * | 10/2003 | Gretz .......................... 248/58 |
| 2004/0113024 A1 | * | 6/2004 | Caveney et al. ............... 248/49 |

* cited by examiner

*Primary Examiner*—Amy J. Sterling

(57) ABSTRACT

A one-piece cable support having a box-shaped mounting assembly. The box-shaped mounting assembly extends over a cable tray portion of the cable support and includes several optional mounting apertures. Once secured to a building structure through the box-shaped assembly, the weight of a suspended bundle of cables is distributed evenly below the box-shaped assembly, thereby permitting the load to be balanced evenly below the assembly and reducing the bending moment and therefore the stress on the wall portion connecting the cable tray and mounting assembly portions of the support. A bracket assembly is provided on the bottom of the cable support to allow easy ganging of multiple cable supports without the need for specialized brackets. Stiffeners are included on the cable support to improve the withstanding of bending forces. A cable retaining arrangement secures cable bundles within the support.

15 Claims, 10 Drawing Sheets

GANGABLE CABLE SUPPORT WITH IMPROVED STIFFNESS

FIELD OF THE INVENTION

This invention relates to cable supports for communications cables rated for high data transmission rates and specifically to a cable support with improved stiffness, an improved cable retaining arrangement, and the capability of being ganged together with additional like cable supports for supporting several bundles of cable.

BACKGROUND OF THE INVENTION

It is common to use high performance electrical telecommunication transmission cable to connect computers, servers, printers, faxes, and other electronic equipment. Unshielded twisted pair (UTP) cable has been developed to meet the high data transmission speeds needed in modern Local Area Networks (LAN). Many LANs today use Category 5 cable, the performance requirements of which are defined by the Electronic Industries Association (EIA) standard TSB-36 for UTP cable.

As data transmission rates increase, to connect various pieces of electronic equipment, it frequently is necessary to route high speed data transmission cable throughout new or existing buildings. Great care is necessary when running UTP cable, as any kinking, sharp bends, or damage to the cable can cause undesirable side effects, such as creation of cross-talk or static between the various conductors.

In new buildings, cable trays are frequently installed. These make it easy to route cable throughout the building as the bend radius of the cables will conform to the bend radius of the trays, and can therefore be controlled. However, routing cable throughout an existing building presents many problems. Frequently, the cable must be routed through an area above a ceiling, such as a building having a drop ceiling. Cable trays are typically not available, and therefore hooks, rings, or similar devices must be used to create a suitable path for laying cable.

Several J-shaped hooks have been proposed for the support of communications cables. Although the prior art J-hooks provide a secure anchor for communications cables, they do not provide a balanced support and evenly distribute the weight of a suspended bundle of cables on the top stem. With a bundle of cables supported from the J-hook, a large bending moment or force is exerted on the stem. Therefore, a bundle of cables suspended in a J-hook may eventually cause the hook material to fatigue and break near the anchoring point, especially when anchored to structures that are susceptible to vibrations, such as air plenums and the like. The prior art J-hooks are also less than optimal when used to support several separate bundles of cables from the same anchoring point. The prior art J-hooks cannot be ganged directly to each other for holding multiple bundles of cables, but rather require the use of a specially designed bracket.

U.S. Pat. No. 6,629,676 (hereinafter the '676 patent) to Gretz, incorporated herein by reference in its entirety, proposed a cable support having a box-shaped mounting assembly that allowed a cable support to be easily ganged directly to additional like cable supports without use of a separate bracket. This simplified the task of ganging cable supports and thereby eliminated the need to stock additional parts such as brackets.

Although the '676 patent provided a novel cable support which simplified ganging together of several supports, the cable support described therein could be further improved by stiffening the cable receiving portion of the support and also by providing an improved cable retaining arrangement for securing cables within the support.

U.S. Pat. No. 5,740,994 (hereinafter the '994 patent) to Laughlin is another cable support using, among other things, cable ties to confine a bundle of cables without contact between the cable and the tie and has a saddle with downturned obtuse angle lateral edges. It has been found that neither of these features is important and these features are not used in the present invention.

Therefore, what is needed is a balanced cable support capable of evenly distributing the weight of a suspended bundle of cables and capable of being ganged directly to additional supports for the support of large bundles of communications cables. The cable support should also have adequate stiffness to resist bending moments caused by the weight of suspended bundles of cables. Additionally, the cable support should include a cable retaining arrangement for keeping cable bundles secured within the support.

OBJECTS OF THE INVENTION

Accordingly, the cable support of the present invention exhibits several advantages over prior art cable supports for communications cables. The cable support is of a design that insures a suspended weight will be balanced evenly below the anchoring point. The cable support includes stiffeners for improving the stiffness of the support to allow improved withstanding of bending moments caused by the suspended weight of cable bundles. The cable support also includes a cable retaining arrangement for keeping cable bundles secured within the support.

Additionally, the present invention provides a cable support that may easily be ganged directly to additional like cable supports without use of a separate bracket or other piece. This simplifies the task of ganging cable supports and thereby eliminates the need to stock additional parts such as brackets.

When ganged together, the present invention also has the advantage of presenting a balanced column of cable supports. The cable supports link to each other in a manner in which the weight is distributed evenly from the bottommost support to the topmost support. This has the advantage of causing less undue stress to individual portions of the combined tree of supports.

These and other advantages will become obvious by reading the attached detailed description of the present invention along with reference to the drawings and the appended claims.

SUMMARY OF THE INVENTION

The invention is a one-piece cable support having a box-shaped mounting assembly. The box-shaped mounting assembly extends over a cable tray portion of the cable support and includes several optional mounting apertures. Once secured to a building structure through the box-shaped assembly, the weight of a suspended bundle of cables is distributed evenly below the box-shaped assembly, thereby permitting the load to be balanced evenly below the assembly and reducing the bending moment and therefore the stress on the wall portion connecting the cable tray and mounting assembly portions of the support. A bracket assembly is provided on the bottom of the cable support to allow easy ganging of multiple cable supports without the need for specialized brackets. Stiffeners are included on the cable support to improve the withstanding of bending forces. A cable retaining arrangement secures cable bundles within the support.

DESCRIPTION OF THE DRAWINGS

FIG. 7 is a perspective view depicting two cable supports according to the present invention ganged together and secured to a structure to support two bundles of cables there between.

Figure 1:
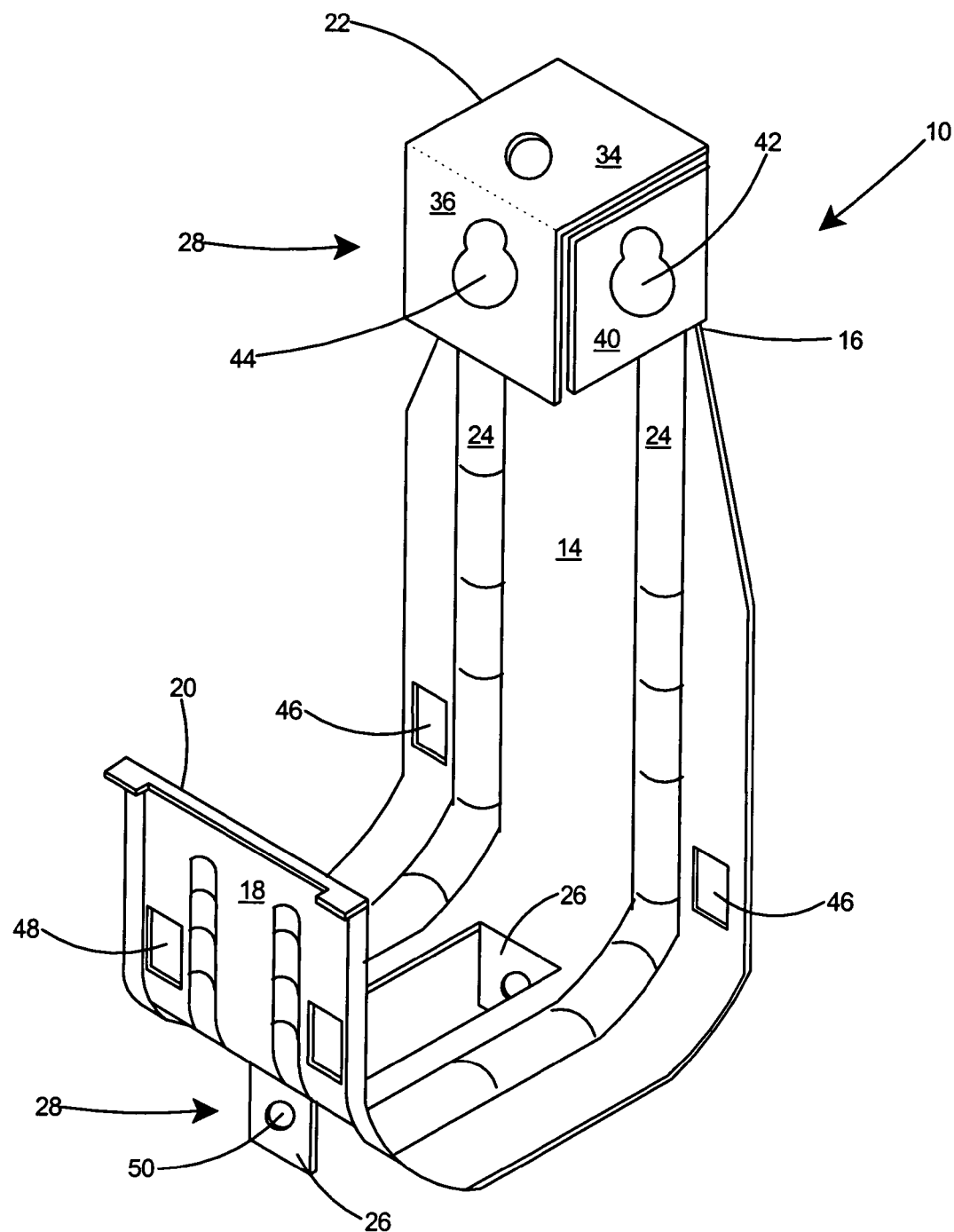
FIG. 1 is a perspective view of a preferred embodiment of the cable support according to the present invention.

| Index to Reference Numerals in Drawings | |
|---|---|
| 10 | cable support |
| 10A | first cable support |
| 10B | second cable support |
| 12 | cable tray |
| 14 | rear wall |
| 16 | top end of rear wall |
| 18 | front wall |
| 20 | top end of front wall |
| 22 | box-shaped mounting assembly |
| 24 | stiffener |
| 26 | receiving tab |
| 28 | fastening arrangement |
| 29 | ridge |
| 30 | inner surface |
| 31 | outer surface |
| 32 | cable bundle |
| 33 | bottom portion of cable tray |
| 34 | top wall of mounting assembly |
| 35 | gap |
| 36 | front wall of mounting assembly |
| 38 | rear wall of mounting assembly |
| 40 | side wall of mounting assembly |
| 42 | aperture in side wall of mounting assembly |
| 44 | aperture in front and rear wall of mounting assembly |
| 46 | tie-retaining aperture in rear wall of cable support |
| 48 | tie-retaining aperture in front wall of cable support |
| 50 | aperture in receiving tab |
| 52 | support |
| 54 | fastener |
| 56 | fastener |
| 58 | cable retaining arrangement |
| 60 | tie |
| 64 | lip |
| 66 | ends of lip |
| 68 | forward extending tab |
| 70 | cable-receiving portion |
| 72 | lower portion of rear wall |
| 74 | side edges of cable-receiving portion |
| 76 | reinforcing member |
| 78 | outer surface of cable-receiving portion |
| 81 | lower forward end of box-shaped mounting assembly |
| 82 | offset distance |

DETAILED DESCRIPTION OF THE INVENTION

With reference to FIG. 1, there is shown a preferred embodiment of a cable support 10 according to the present invention. The cable support 10 includes a cable tray 12 and a rear wall 14 that extends vertically from the cable tray 12 to a top end 16. A front wall 18 extends vertically from the cable tray 12 to a top end 20. A box-shaped mounting assembly 22 projects substantially forward from the top end 16 of the rear wall 14. One or more stiffeners 24 extend along the rear wall 14, the cable tray 12, and the front wall 18. Two or more receiving tabs 26 extend downwardly from the cable tray 12. A fastening arrangement 28 is included in the box-shaped mounting assembly 22 and the receiving tabs 26 to enable two or more of the cable supports 10 to be joined together by aligning the receiving tabs 26 with the box-shaped mounting assembly 22 and fastening with the fastening arrangement 28.

Figure 2:
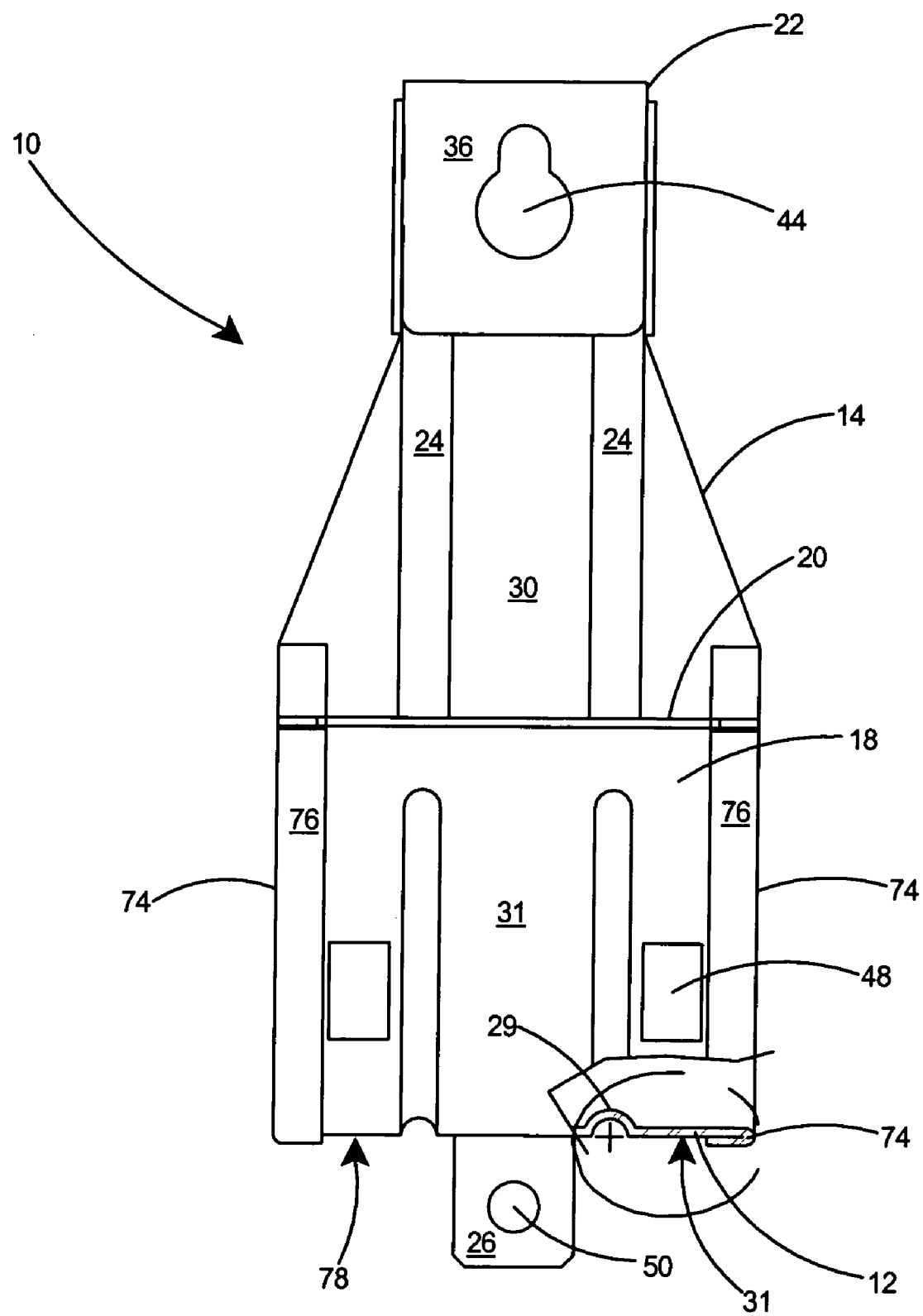
FIG. 2 is a front view of the cable support of FIG. 1.

Referring to FIG. 2, as shown in the cutaway portion of the cable support 10 at the bottom right of the figure, the stiffeners 24 are ridges 29 formed integrally in the cable tray 12, the rear wall 14, and the front wall 18. The cable tray 12, rear wall 14, and front wall 18 of the cable support 10 include an inner 30 and an outer 31 surface with the ridges 29 formed on the inner surfaces 30.

Figure 3:
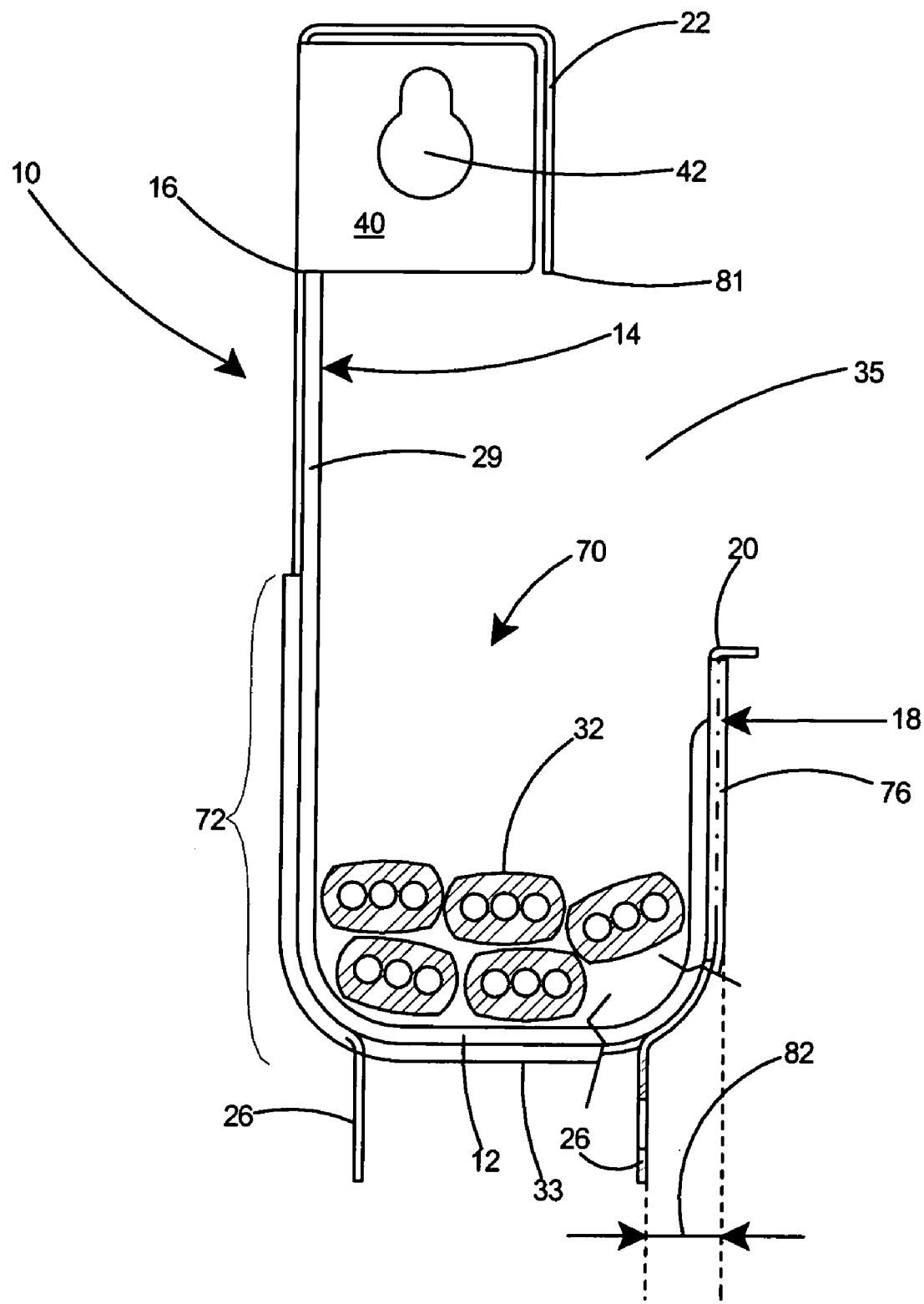
FIG. 3 is a side view of the cable support of FIG. 1.

As shown in FIG. 3, the rear wall 14 extends vertically substantially beyond the vertical extent of the front wall 18, thereby situating the top end 16 of the rear wall 14 substantially above the top end 20 of the front wall 18. This provides a wide gap 35 between the box-shaped mounting assembly 22 and the top end 20 of the front wall 18 for accommodating placement of a cable bundle 32 therein. The cable tray 12 includes a substantially flat bottom portion 33.

Figure 4:
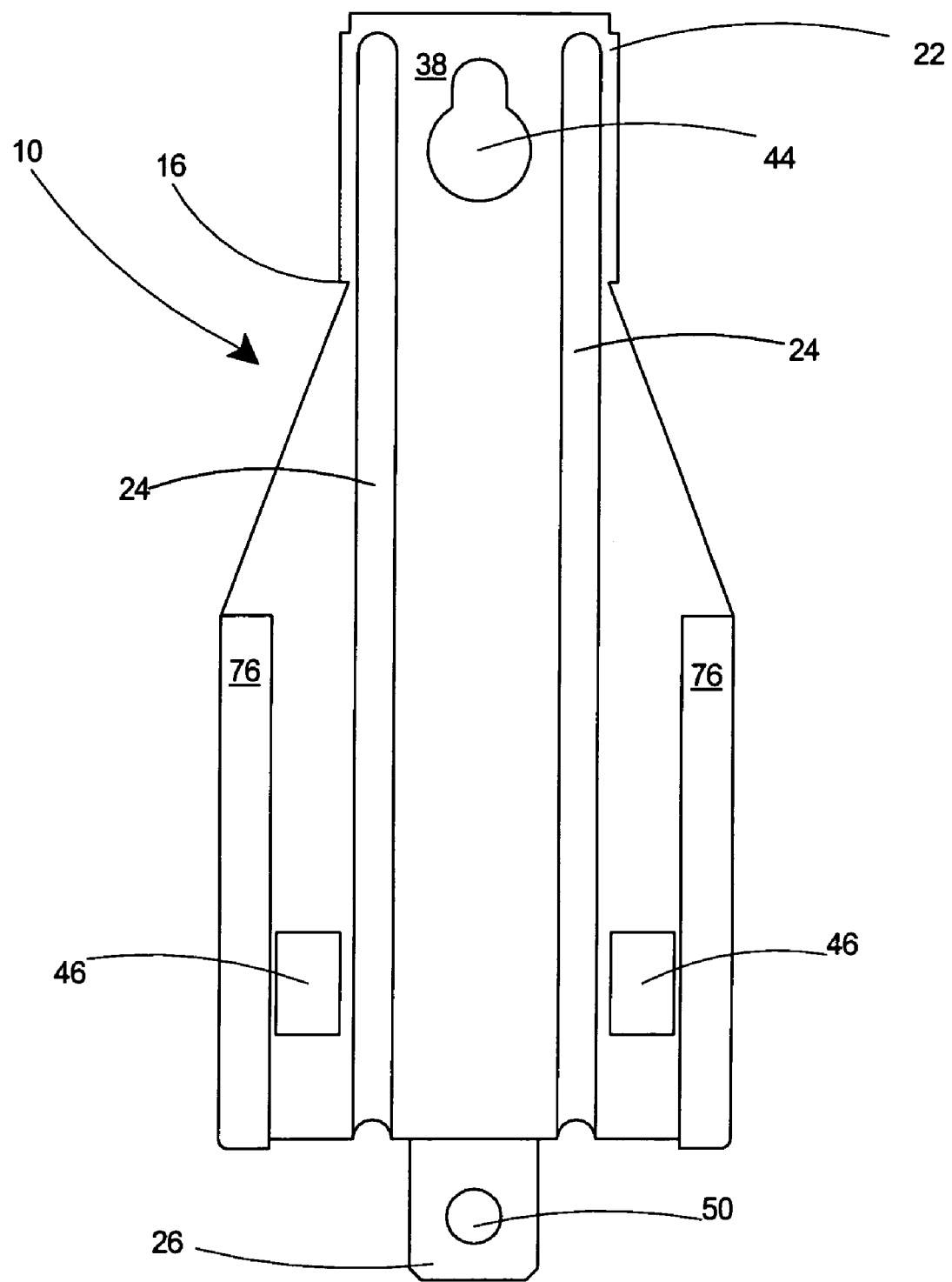
FIG. 4 is a back view of the cable support of FIG. 1.
Figure 5:
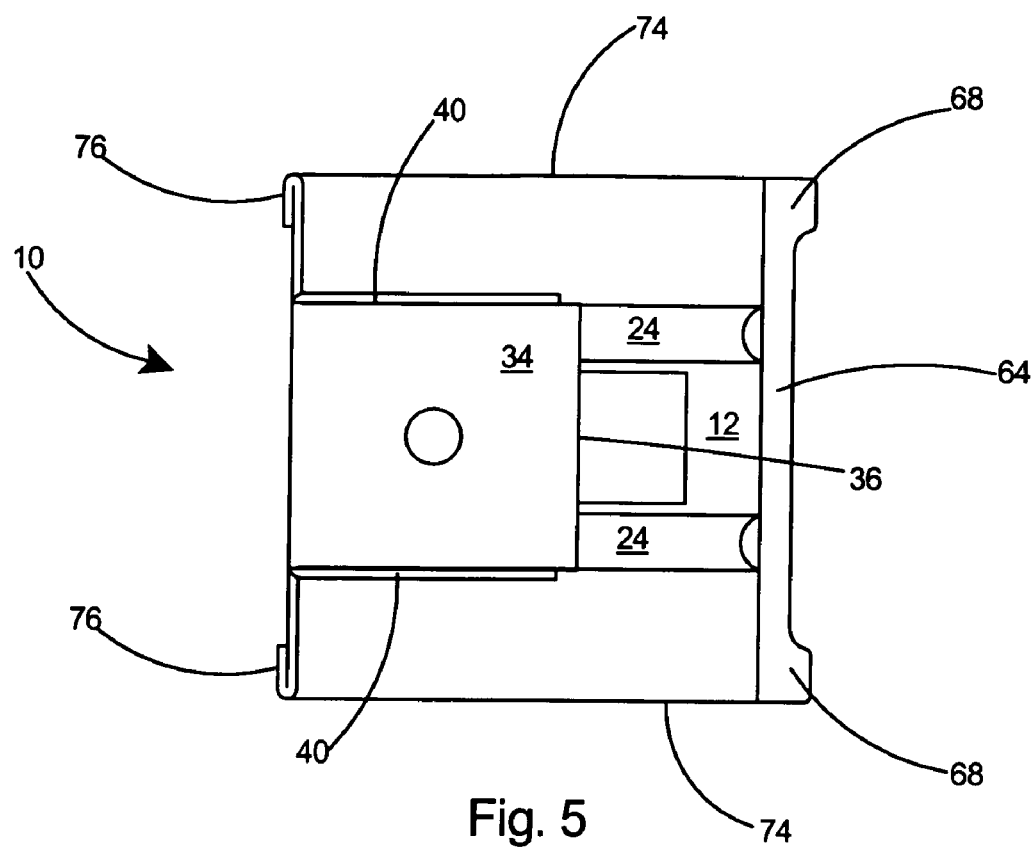
FIG. 5 is a top view of the cable support of FIG. 1.
Figure 6:
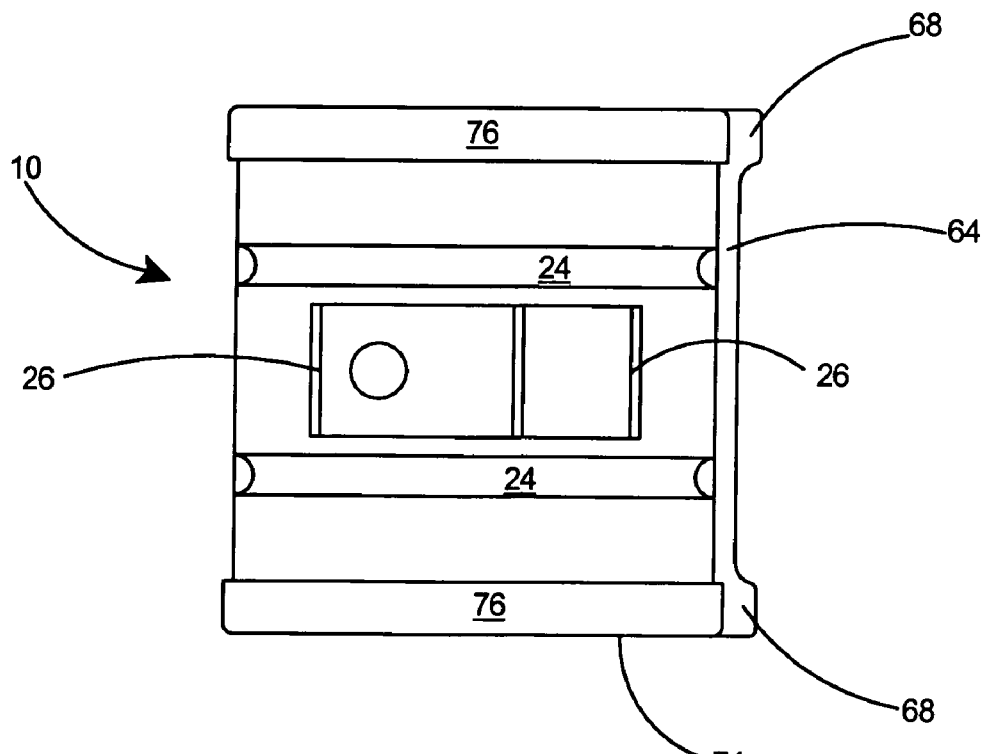
FIG. 6 is a bottom view of the cable support of FIG. 1.

Referring to the top view in FIG. 5, the box-shaped mounting assembly 22 preferably includes a top wall 34, a front wall 36, a rear wall 38, and two side walls 40. With reference to FIG. 1, the side walls 40 of the box-shaped mounting assembly 22 include apertures 42 therein, with the apertures 42 in the side walls 40 in axial alignment. As shown in FIGS. 2 and 4, the front 36 and rear 38 walls of the box-shaped mounting assembly 22 also include apertures 44 therein, with the apertures 44 in axial alignment.

As shown in FIG. 1, the rear wall 14 of the cable support 10 includes tie-retaining apertures 46 therein and the front wall 18 includes tie-retaining apertures 48 therein, with the apertures 46 in the rear wall 14 preferably in axial alignment with respective apertures 48 in the front wall 18.

Referring to FIG. 3, the receiving tabs 26 include apertures 50 therein, with the apertures 50 in axial alignment.

Figure 7:
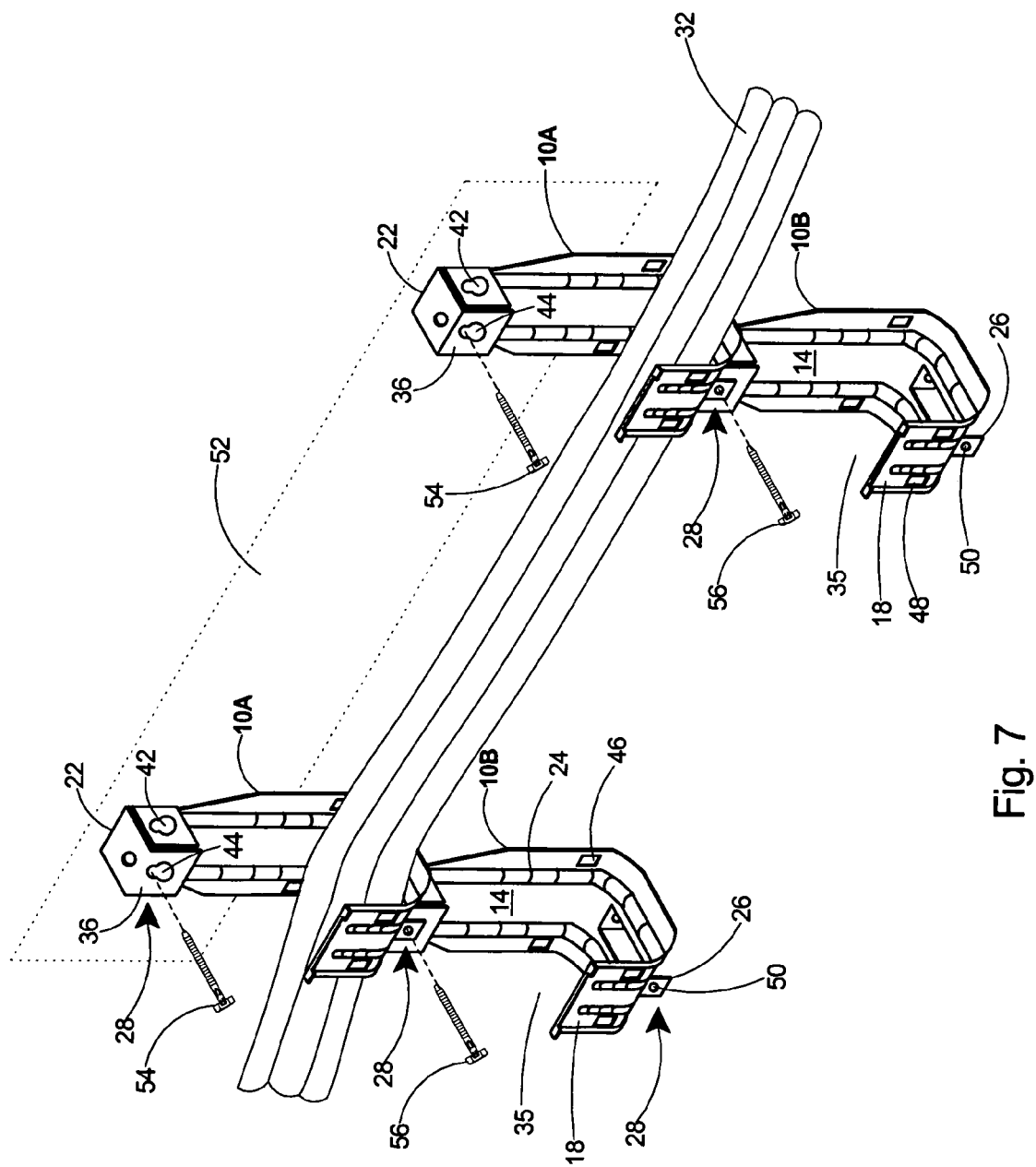

As shown in FIG. 7, two or more cable supports may be secured together using the fastening arrangement 28. The fastening arrangement 28 includes the axially aligned apertures 42, 44 in the box-shaped mounting assembly 22 and the axially aligned apertures 50 in the receiving tabs 26. A first cable support 10A is typically fastened to a support 52 by a fastener 54 inserted through the axially aligned apertures 44 in the front 36 and rear (not shown) walls of the box-shaped mounting assembly 22. Additional cable supports may be secured to the first cable support by inserting the box-shaped mounting assembly 22 of a second cable support 10B within the receiving tabs 26 of the first cable support 10A and inserting a fastener 56, such as a bolt and nut, there through. The fastener 56 secured through the apertures 50 in the receiving tabs 26 and one of the pairs of axially aligned apertures 42, 44 in the box-shaped mounting assembly 22 creates a vertical chain of two cable supports. In the same manner, additional cable supports may be secured to the lowermost cable support to create a longer chain of cable supports for accommodated additional cables.

Figure 8:
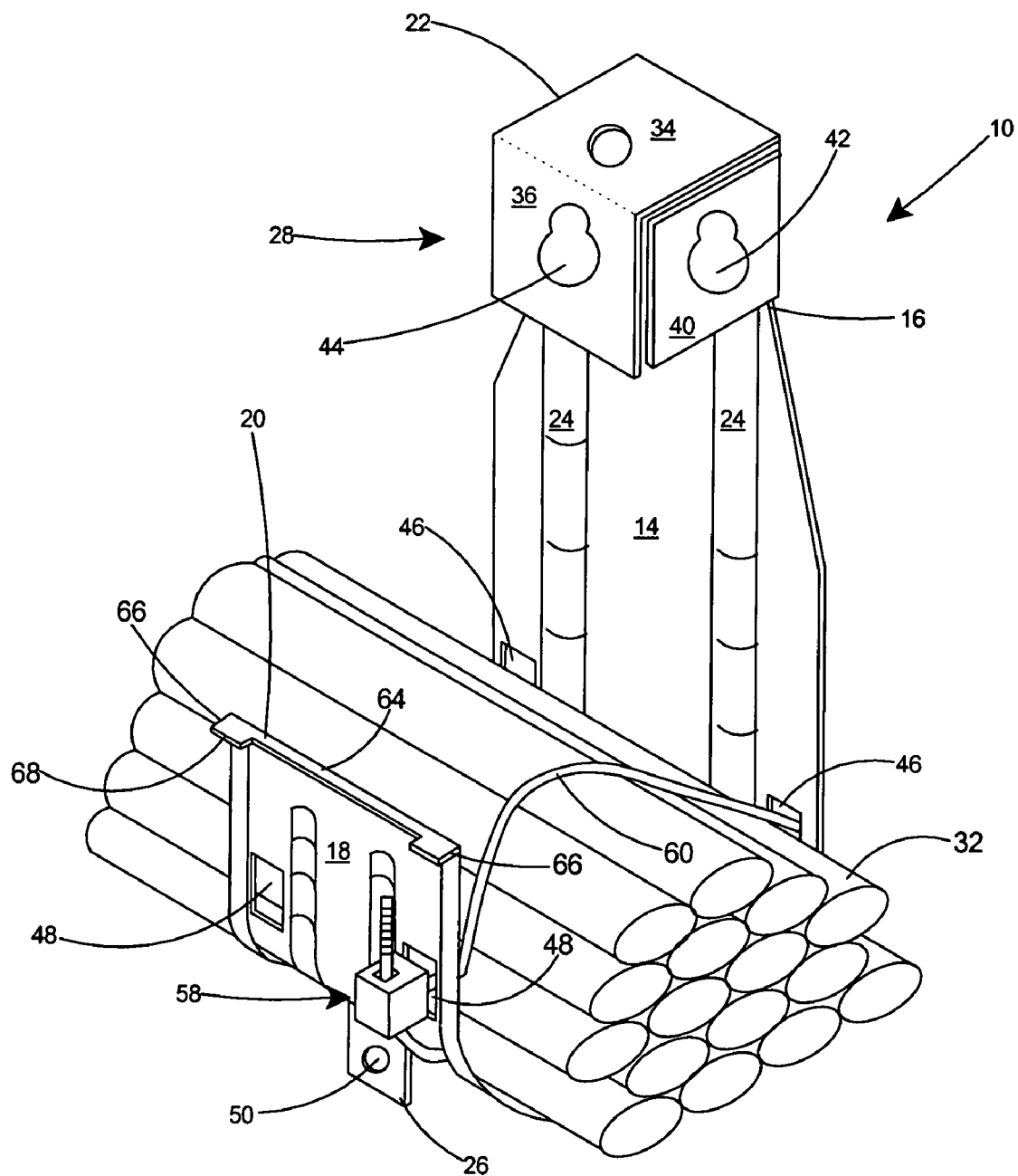
FIG. 8 is a perspective view of the cable support of FIG. 1 with a cable bundle supported therein by a cable retaining arrangement.

Referring to FIG. 8, the preferred embodiment of the cable support 10 further includes a cable retaining arrangement 58. A lip 64 extends forward and outward from the top end 20 of the front wall 18. The lip 64 includes two ends 66 and a forward extending tab 68 extends planar with the lip 64 at each of the ends 66. The cable retaining arrangement 58 includes the forward extending tabs 68 and tie retaining apertures 46, 48 in the rear 14 and front 18 walls of the cable support 10. A tie 60, such as a cable tie, is shown routed around the bottom of the cable tray 12, through the aperture 46 in the rear wall 14, through the aperture 48 in the front wall 18, and secured together near the aperture 48 in the front wall 18. As a result of the apertures 48, 46 in the front 18 and rear 14 walls being located substantially below the top end 20 of the front wall 18 and the cable tie 60 being routed through the apertures 48, 46 as shown in FIG. 8, the cable tie 60 is typically in contact with the cable bundle 32.

Figure 9:
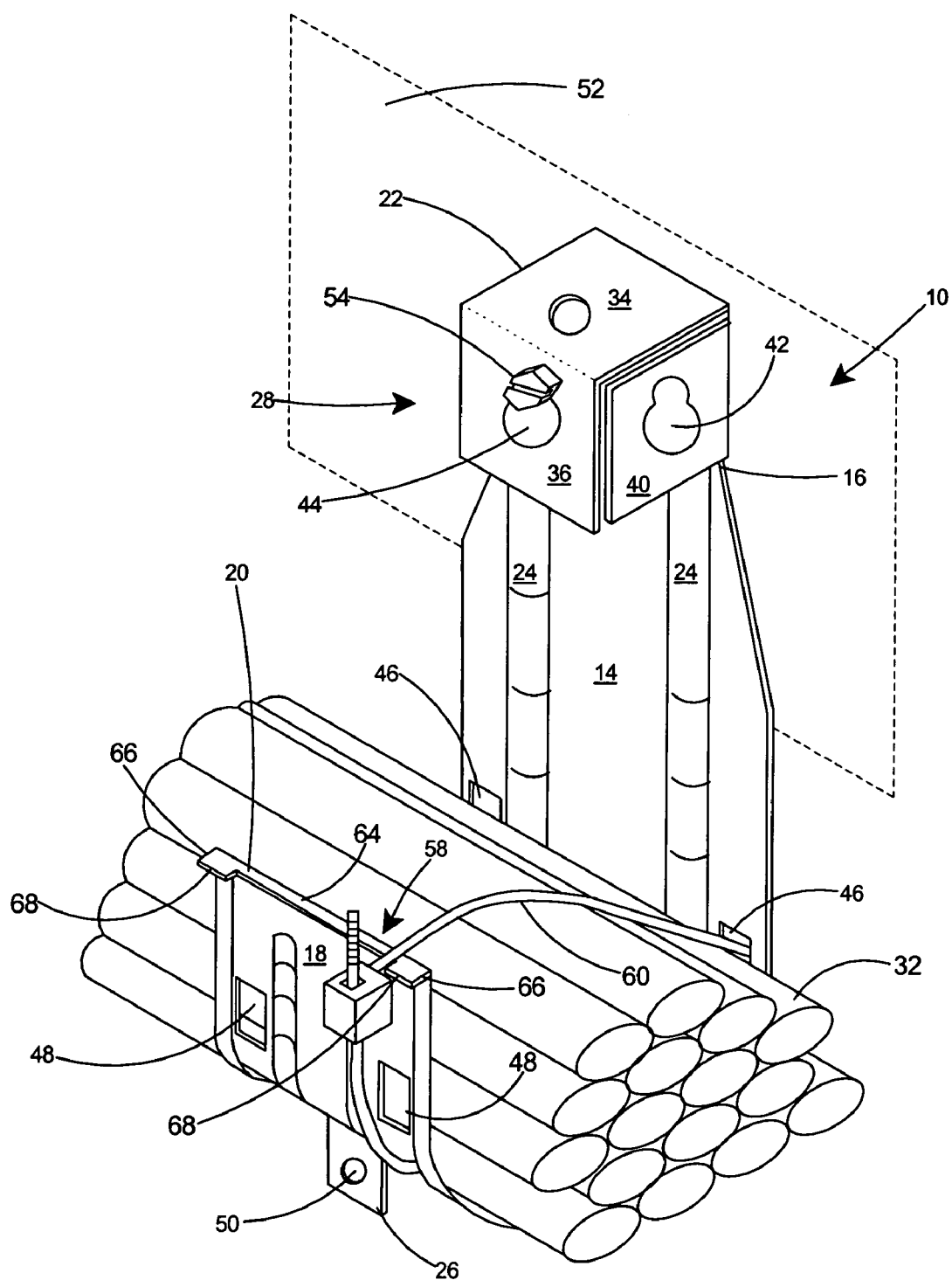
FIG. 9 is a perspective view of the cable support of FIG. 1 with a cable bundle supported therein by a cable retaining arrangement.

With reference to FIG. 9, an alternate cable retaining arrangement 58 includes a tie 60 routed around the bottom of the cable tray 12, inserted through the tie-retaining aperture 46 in the rear wall 14, routed around the forward extending tab 68 on the front lip 64 of the front wall 18, and secured together near the top end 20 of the front wall 18. The cable retaining arrangement 58 includes at least one aperture 46 in the rear wall 14 of the cable support 10 with the aperture 46 substantially below the top end 20 of the front wall 18. As a result of apertures 46 in the rear wall 14 being located substantially below the vertical level of the top end 20 of the front wall 18 and the cable tie 60 being routed across the top end 20 of the lip 64 and through aperture 46 as shown in FIG. 9, the cable tie 60 is typically in contact with the cable bundle 32.

Figure 10:
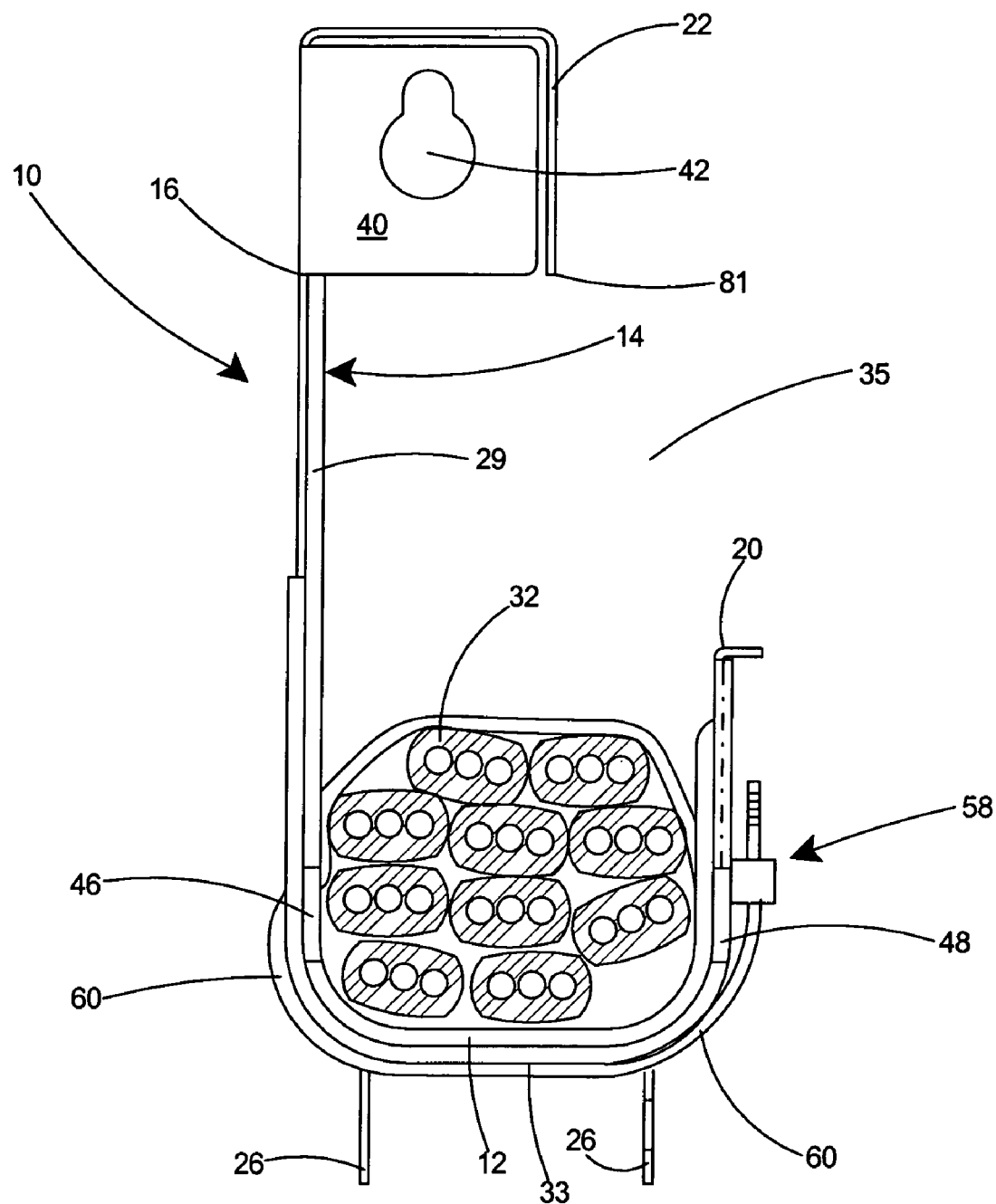
FIG. 10 is a side view of the cable support of FIG. 1 with a cable bundle supported therein by the cable retaining arrangement shown in FIG. 8.

With reference to FIG. 10 there is shown a side view of the cable retaining arrangement of FIG. 8, which depicts the apertures 48, 46 in the front 18 and rear 14 walls located substantially below the top end 20 of the front wall 18 and the cable tie 60 in contact with the cable bundle 32.

Figure 11:
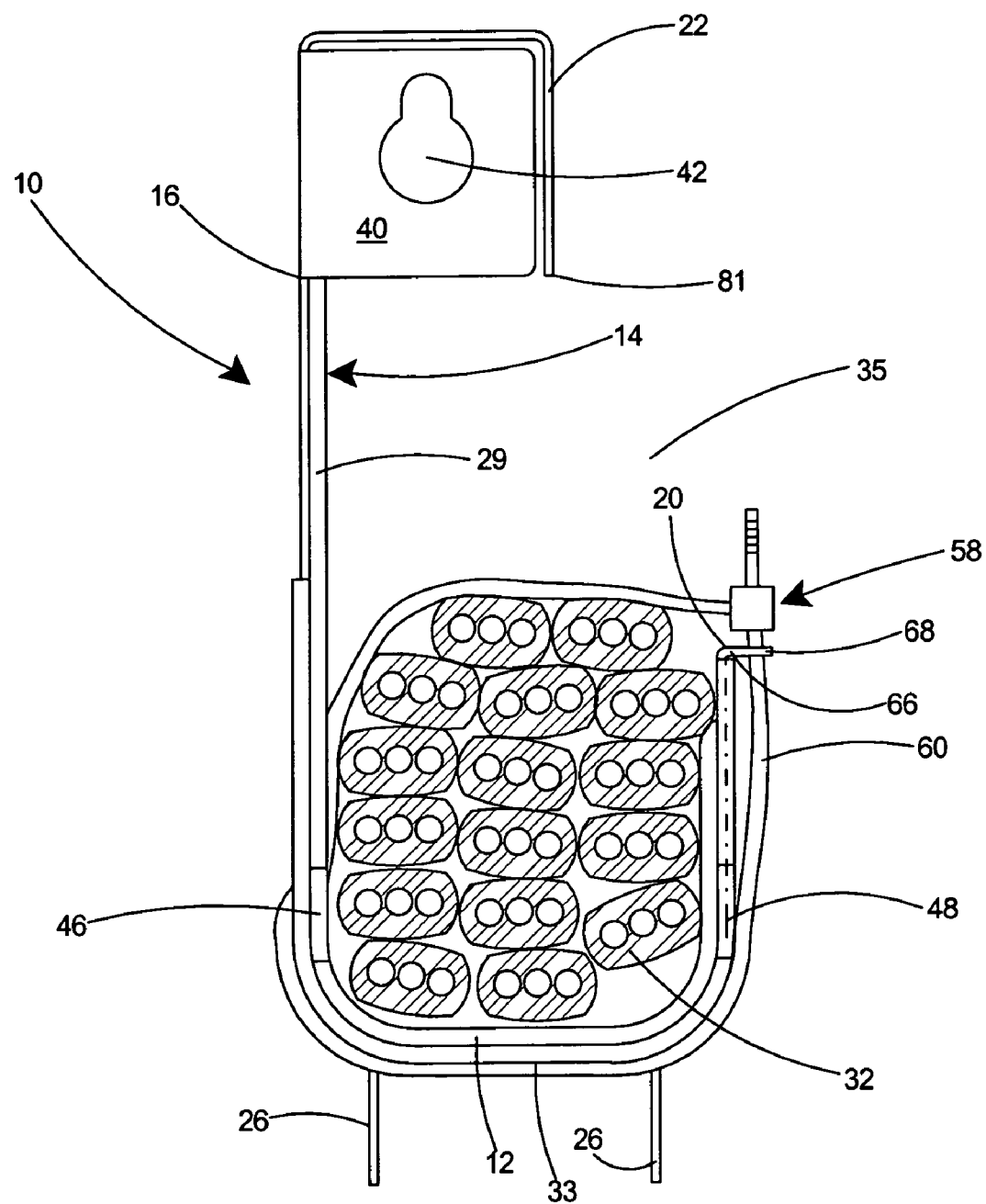
FIG. 11 is a side view of the cable support of FIG. 1 with a cable bundle supported therein by the cable retaining arrangement shown in FIG. 9.

With reference to FIG. 11 there is shown a side view of the cable retaining arrangement of FIG. 9, which depicts the aperture 46 in the rear wall 14 located substantially below the top end 20 of the front wall 18 and the cable tie 60 in contact with the cable bundle 32. By locating the apertures 46, 48 a substantial distance vertically below the top end 20 of the front wall 18, the cable tie 60 is in contact with the cable bundle 32 and therefore holds the cable bundle 32 securely within the cable support 10.

Referring to FIGS. 2 and 3, the cable support 10 further includes a cable-receiving portion 70 comprised of the cable tray 12, the front wall 18, and the lower portion 72 of the rear wall 14. The side edges 74 of the cable-receiving portion 70 include a reinforcing member or flange 76. The reinforcing member 76 extends outward and over and includes at least a portion of the side edges 74. Reinforcing member 76 is thus bent outward and over 180 degrees and flattened against the outer surface 78 of the cable-receiving portion 70. The reinforcing member 76 provides further stiffness and strength to the cable support 10 to enable it to withstand the weight of large bundles of cables and by being flattened has a non-snagging side edge 74.

With reference to the side view of the cable support in FIG. 3, a large gap 35 is provided between the top end 20 of the front wall 18 and the lower forward end 81 of the box-shaped mounting assembly 22. The large gap 35 provides a substantially large opening to accommodate a large bundle of cables 32 as they are inserted within the cable support 10. The receiving tabs 26 are at an offset distance 82 from the front 18 and rear 14 walls of the cable support 10. With reference to FIG. 7, as a result of the offset, connecting a first of the cable supports to a second of the cable supports by the fastening arrangement 28 forms an upper 10A and a lower 10B cable support and furthermore positions the front wall 18 of the lower cable support 10B forward of the front wall 18 of the upper cable support 10A by the offset distance. Positioning the front wall 18 of the lower cable support 10B forward of the front wall 18 of the upper cable support 10A in this manner positions the gap 35 farther forward by the offset distance, thereby making the gap 35 of the lower cable supports 10B more accessible for insertion of cable bundles 32 therein.

Once secured to a support 52 by a fastener 54 through the apertures 44 in the box-shaped mounting assembly 22, such as shown in FIG. 9, the weight of a suspended cable bundle 32 is distributed evenly below the box-shaped assembly 22, thereby permitting the load to be balanced evenly below the assembly and reducing the bending moment and therefore the stress on the rear wall 14 connecting the cable tray 12 and mounting assembly 22 portions of the cable support 10.

The cable support of the present invention is preferably constructed of metal. Preferably, the cable support is formed in one piece from a blank or flat piece of metal. The apertures are typically punched out and the cable support formed by bending the metal blank around predetermined bend lines (not shown).

It should be recognized by the above detailed description that the cable support of the present invention exhibits several advantages over prior art J-hook type cable supports for communications cables. The cable support 10 exhibits increased stiffness as a result of stiffeners 24 on the rear wall 14 and the cable-receiving portion 70. A reinforcing member 76 provides further improvements in stiffness. The improvements in stiffness allow better withstanding of bending moments caused by the suspended weight of large bundles of cables.

A further advantage is provided by a cable retaining arrangement 58, which keeps cable bundles secured within the support.

A further advantage, as a result of the box-shaped mounting assembly, is that a suspended weight will be balanced evenly below the anchoring point. As a result of balancing the suspended weight below the anchoring point, no excessive bending moment is created to cause fatigue to the support.

Additionally, the present invention provides a cable support that may easily be ganged directly to additional like cable supports without use of a separate bracket or other device. This simplifies the task of ganging cable supports and thereby eliminates the need to stock additional parts such as brackets.

When ganged together, the present invention also has the advantage of presenting a balanced column of cable supports. The cable supports link to each other in a manner in which the weight is distributed evenly from the bottommost support to the topmost support. This has the advantage of causing less undue stress to individual portions of the combined column of supports.

Although the description above contains many specificities, these should not be construed as limiting the scope of the invention but as merely providing illustrations of some of the presently preferred embodiments of this invention.

Thus the scope of the invention should be determined by the appended claims and their legal equivalents, rather than by the examples given.

What is claimed is:

1. A cable support comprising:
   a cable tray;

a rear wall extending vertically from said cable tray to a top end;

a front wall extending vertically from said cable tray to a top end;

a box-shaped mounting assembly projecting substantially forward from said top end of said rear wall;

one or more stiffeners extending along said rear wall, said cable tray, and said front wall;

two or more receiving tabs extending downwardly from said cable tray;

a fastening arrangement in said box-shaped mounting assembly and said receiving tabs; and a lip extending forward and outward from said top end of said front wall, said lip including two ends and a forward extending tab extending planar with said lip at each of said ends;

whereby two or more of said cable supports may be joined together by aligning said receiving tabs with said box-shaped mounting assembly and fastening with said fastening arrangement.

2. The cable support of claim 1 wherein said stiffeners are ridges formed integrally in said cable tray, said rear wall, and said front wall.

3. The cable support of claim 1 wherein said rear wall extends vertically substantially beyond the vertical extent of said front wall.

4. The cable support of claim 1 wherein said box-shaped mounting assembly includes a top wall;

a front wall;

a rear wall; and two side walls.

5. The cable support of claim 4 wherein said rear and front walls of said box-shaped mounting assembly include apertures therein, said apertures in said rear wall in axial alignment with respective apertures in said front wall.

6. The cable support of claim 5 wherein said side walls of said box-shaped mounting assembly include apertures therein, said apertures in axial alignment.

7. The cable support of claim 6 wherein said receiving tabs include apertures therein, said apertures in axial alignment.

8. The cable support of claim 4 wherein said fastening arrangement includes at least one pair of axially aligned apertures in said box-shaped mounting assembly; and axially aligned apertures in said receiving tabs.

9. The cable support of claim 8 wherein said fastening arrangement includes a fastener secured through said axially aligned apertures in said receiving tabs and through said pair of axially aligned apertures in said box-shaped mounting assembly.

10. The cable support of claim 2 wherein said cable tray, said rear wall, and said front wall include an inner and an outer surface.

11. The cable support of claim 10 wherein said ridges are formed on the inner surface of said cable tray, rear wall, and front walls.

12. The cable support of claim 1 further including a cable retaining arrangement.

13. The cable support of claim 12 wherein said cable retaining arrangement includes at least one aperture in said front and rear walls, said apertures substantially below said top end of said front wall.

14. The cable support of claim 1 wherein said receiving tabs are at an offset distance from said front and rear walls such that connecting one of said cable supports to a second of said cable supports by said fastening arrangement forms an upper and a lower cable support and furthermore positions the front wall of said lower cable support forward of the front wall of said upper cable support by said offset distance.

15. A cable support comprising:

a cable tray;

a rear wall extending vertically from said cable tray to a top end;

a front wall extending vertically from said cable tray to a top end;

a box-shaped mounting assembly projecting substantially forward from said top end of said rear wall;

one or more stiffeners extending along said rear wall, said cable tray, and said front wall;

two or more receiving tabs extending downwardly from said cable tray;

a fastening arrangement in said box-shaped mounting assembly and said receiving tabs;

said cable tray, said front wall, and said rear wall forming a cable-receiving portion having an inner and an outer surface;

side edges on said cable-receiving portion; and a reinforcing member on said side edges including at least a portion of said side edges bent over 180 degrees and flattened against said outer surface of said cable-receiving portion;

whereby two or more of said cable supports may be joined together by aligning said receiving tabs with said box-shaped mounting assembly and fastening with said fastening arrangement.

* * * * *